E. SWASEY.
Wheels for Vehicles.

No. 155,598. Patented Oct. 6, 1874.

WITNESSES.
Louis Finger
W. E. Boardman

Edwin Swasey.
F. Curtis. Atty.

UNITED STATES PATENT OFFICE.

EDWIN SWASEY, OF MILFORD, MASSACHUSETTS, ASSIGNOR OF ONE-HALF HIS RIGHT TO JAMES A. PRENTICE, GEORGE W. PRENTICE, AND CHARLES P. NELSON, OF SAME PLACE.

IMPROVEMENT IN WHEELS FOR VEHICLES.

Specification forming part of Letters Patent No. 155,598, dated October 6, 1874; application filed April 16, 1874.

*To all whom it may concern:*

Be it known that I, EDWIN SWASEY, of Milford, Worcester county, Massachusetts, have invented certain Improvements in Carriage-Wheels, of which the following is a specification:

These improvements relate to the construction of the hub of a wheel by the employment of an annular channel whose walls are undercut or dovetailed, and upon whose bottom is created a wedge-shaped annular spur or rib, the spoke or the tenon upon the larger end of the same being driven into the channel and split upon the rib, by which its sides are expanded and caused to tightly fill the channel, a bolt or rivet being subsequently driven through the walls of the channel and the spoke as an additional security; and, secondly, these improvements relate to a novel method of confining the ends of the felly together, and securing the spoke to the felly by one and the same support, substantially as hereinafter explained.

Figure 1:
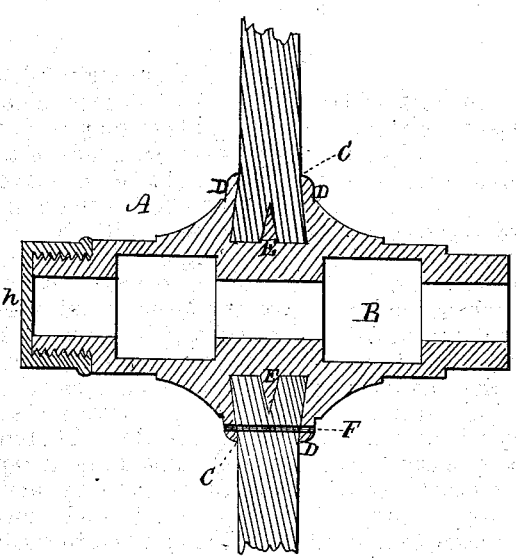
Figure 2:
Figure 4:
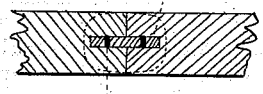
Figure 3:
Figure 5:
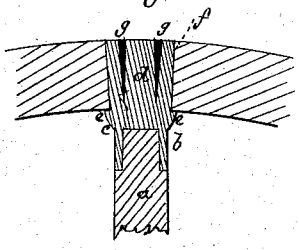

The drawings accompanying this specification represent, in Figure 1, a vertical longitudinal section; Fig. 2, a horizontal section; Fig. 3, a transverse section of my invention. Fig. 4 is a horizontal section, showing the invention applied to the felly-joint.

In these drawings, A represents the hub of my wheel as composed of one piece of cast-iron, the bearing or box for receiving the axle being shown at B. Upon or within the outer periphery of the hub A I create an annular encircling channel, C, the walls D D of which are undercut or dovetailed, as represented, while upon the bottom of the channel is created a central wedge-shaped annular collar or rib, E. The end of the spoke is driven into the channel C, and down to the bottom thereof, the result being that the wedge E splits the spoke and presses its sides outward against the adjacent wall with great power, thus dovetailing it within and to the hub. For additional security, I pass a bolt or rivet, F, through the walls D and the spoke; but this may not, under all circumstances, be necessary or advisable. The outer and smaller end *a* of each spoke is let into a socket, *b*, created in a cylindrical metallic block, *c*, the opposite end of such block being reduced to a thin plate or tongue, *d*, while between the two, and upon each side of the tongue and parallel with it, are two concave lips, *e*, which receive or embrace the under side of the felly, and, in connection with the tongue, retain its two abutting ends firmly in place.

If the socketed clamp above described is to be employed to unite the spoke to the felly, a mortise, *f*, is made in the latter, of a size to receive the tongue *d*, and the latter is driven into it. With a chisel or other suitable tool, one or more transverse incisions or cuts, *g*, are now made in the tongue, which has the effect of expanding or spreading it within the mortise in the felly, and compelling it to hug tightly within such mortise.

When applied to the joint between the two ends of a felly or the segments of the same, a mortise is made which extends into each end, and the tongue is driven into and spread within it, the lips *e* embracing the inner sides of the felly, and serving to aid in confining them securely together, the socket *b* receiving the spoke, as before.

It will thus be seen that the metallic clamp, made as described, constitutes both a spoke-socket and a felly-clasp in one casting, and may be employed for one or both purposes without change.

I affix to the outer end of the hub, by screw-threads or otherwise, so as to be readily removed and applied, a metallic cap, *h*, which tightly closes the end of the axle and the nut upon the same, thus concealing these parts and preventing access of dust or dirt, and constituting a highly ornamental finish.

In conclusion, I would state that I do not claim, broadly, expanding the base of the spoke into an undercut or dovetailed channel or mortise in the hub. I am aware that this has been heretofore accomplished by means of wooden wedges inserted in slits in the ends of the spokes before they are driven into the mortises or channel; nor do I broadly claim expanding the end of the spoke-socket in the felly, for I am aware that this, also, has been done before.

What I do claim as my invention is as follows:

1. The metallic hub formed with a dovetailed channel or mortise, C, for receiving the spokes, and a wedge-shaped spreader, F, projecting from the bottom of the channel or mortise C, and adapted to expand the end of the spoke driven into said channel or mortise, substantially as shown and described.

2. In combination with the felly and spoke, the felly-clasp and spoke-socket, consisting of the metallic block c, having the tubular end b, tongue d, and lips e e, the tongue being let into a mortise in the felly and expanded therein, and the lips supporting or steadying the abutting ends of the felly, as and for the purpose set forth.

EDWIN SWASEY.

Witnesses:
WM. B. HALE,
PERLEY P. FIELD.